United States Patent [19]

Herzan et al.

[11] 4,240,466

[45] Dec. 23, 1980

[54] PUSH-PULL COUPLING

[75] Inventors: Eugene H. Herzan, Minnetonka; Stanlee W. Meisinger, Plymouth, both of Minn.

[73] Assignee: Parker-Hannifin Corporation, Cleveland, Ohio

[21] Appl. No.: 3,172

[22] Filed: Jan. 15, 1979

[51] Int. Cl.³ .................... F16L 37/28; F16L 37/22
[52] U.S. Cl. .................. 137/614.04; 285/316
[58] Field of Search ............ 285/277, 316; 251/149, 251/149.1, 149.3, 149.6, 149.8; 137/614, 614.01, 614.02, 614.03, 614.04, 614.05

[56] References Cited

U.S. PATENT DOCUMENTS

| | | | |
|---|---|---|---|
| 2,548,528 | 4/1951 | Hansen | 285/316 |
| 3,039,794 | 6/1962 | Cenzo | 137/614.03 |
| 3,076,671 | 2/1963 | Freeman | 285/277 |
| 3,097,867 | 7/1963 | Saloum | 285/277 |
| 3,234,965 | 2/1966 | Anderson | 137/614.04 |
| 3,567,255 | 11/1968 | Evans | 251/149.6 |
| 3,674,051 | 7/1972 | Stratman | 137/614.04 |
| 3,964,771 | 6/1976 | Baudouin | 285/315 |

FOREIGN PATENT DOCUMENTS 2447530  4/1975  Fed. Rep. of Germany .......... 285/316

*Primary Examiner*—Martin P. Schwadron
*Assistant Examiner*—A. Michael Chambers
*Attorney, Agent, or Firm*—Joseph B. Balazs

[57] ABSTRACT

A push-pull type fluid coupling having interfitting male and female bodies. The female body carries radially movable ball detents to lock the male body in position, the detents being held inwardly by a rigidly mounted sleeve which supports the female body for relative axial movement. Both bodies have spring biased fluid retaining valves which are opened when the bodies interfit but close when they are disconnected. Two axially disposed springs surround the female body member and coact with the sleeve to resist movement of the body members in one direction, thus providing one level of required uncoupling force while only one of the springs is operative to resist movement of the body members in the other direction, thus providing a reduced force requirement for coupling.

4 Claims, 4 Drawing Figures

PUSH-PULL COUPLING

BACKGROUND OF THE INVENTION

1. Field of the Invention

This invention relates to fluid couplings and more particularly to a push-pull or breakaway type coupling usable for example between a tractor and an implement towed therebehind, in which disconnection of the coupling can be made by a mere pulling action.

2. Description of the Prior Art

It is commonplace to employ the breakaway type coupling between, for example, a tractor and an implement towed thereby for automatic disconnection in the event of either intentional or accidental mechanical disconnection of the towed implement. It is further well known in the art to provide internal valves in the male and female interfitting elements of the breakaway connector so as to prevent spillage or loss of fluids or the like. Prior art devices have been successful in this regard, however with the need for larger coupling devices in association with larger towed implements and in order to provide adequate levels of fluid or material flow it has become necessary to provide a relatively simple mechanism for effecting the connect and disconnect function without unduly increasing its size. Further, because of the high mass of hose which typically is joined to the halves of the coupler device, much higher levels of disconnect forces are being encountered, in other than the breakaway situation.

In couplers which are sized for one and one quarter inch hose, the weight of the hose and the associated hose inertia and the like have resulted in a requirement for preventing disconnections for forces on the order of up to one hundred pounds. In most conventional couplers, connecting and disconnecting forces are approximately on the same level, thus imposing a burden on coupling which is often difficult to achieve. It would be preferable to tailor the levels of connect and disconnect forces for the particular needs and to have a simplified coupling structure, than to have some accomodation therebetween in an effort to reduce the overall size of the coupling elements.

Similar push-pull and breakaway type couplings are known in the art, none of which provide a desired advantageous configuration for large size coupling devices.

Thus, in U.S. Pat. No. 3,567,255 there is shown a breakaway coupling having an interior valving for preventing loss of fluid upon uncoupling. Locking and unlocking forces are provided by an annular overcenter spring, however, there is no teaching of reduction of coupling force in a mechanism which provides a desired high level of uncoupling force.

In U.S. Pat. No. 3,674,051 there is described a coupler using plural compression springs which are selectively utilized during coupling and uncoupling operations. This coupler however is especially suited for actuation when pressure is existent in the system. It relies on the use of springs having different spring rates in conjunction with a relatively complex mechanism including plural detent devices, a structure which is inordinately complex and bulky in the large size range of couplers.

U.S. Pat. No. 3,964,771 describes a push-pull connector which provides different levels of coupling and uncoupling force, this being accomplished by way of a radially compressible annular spring and cooperating ramp surfaces, a structure likely not well suited in the rugged high force level environment.

SUMMARY OF THE INVENTION

The present invention provides a push-pull type coupling especially suited for the transfer of anhydrous ammonia in the agricultural application and is particularly designed for the larger size hoses, in this instance, on the order of one and one quarter inches in diameter. The male coupling may be connected by means of a hose to a nurse tank or the like which is towed on a trailer by a tractor while the female portion of the coupler is suited for mounting by means of an outer sleeve to the framework of an implement such as a cultivator or the like which is also towed by the tractor. A hose connected to the female coupler portion supplies fluid to a metering or distribution tank which in turn is connected to a plurality of tubes for directing the anhydrous ammonia toward the ground, typically behind the tines of the cultivator implement.

While the sleeve of the female coupler is rigidly bolted to the implement the body portion therein is relatively movable under the urging of the male coupler and this relative movement is utilized to operate a ball detent retaining mechanism for securing or releasing the male coupler. Each of the male and female body elements carries a spring actuated flow shut-off valve therein to provide automatic shut-off at the time of disconnection, which valves are moved to the open position upon the elements being completely coupled.

A dual spring arrangement between the female body member and the outer sleeve provides the desired dual levels of coupling and uncoupling force, both of the springs being subject to compression to provide a high level of force to resist the uncoupling action of the male element of the connector while only one of the springs is compressed upon movement of the male coupler in the opposite direction during coupling to provide a lower level of coupling force. Bleed valves and appropriate shut-off valves are provided either in conjunction with the connector or with other elements of a fluid transmission system to avoid the requirement of coupling or uncoupling under pressure. Slight losses of fluid during coupling or uncoupling are considered relatively inconsequential.

Thus, what is provided is a relatively large size coupling suited especially for high flow transfer of anhydrous ammonia by way of heavy hoses or other devices which impose high transitory force levels on the coupler, and yet a device which provides coupling force requirements in a conveniently sized non-complex structure.

DESCRIPTION OF THE PREFERRED EMBODIMENT

Figure 1:
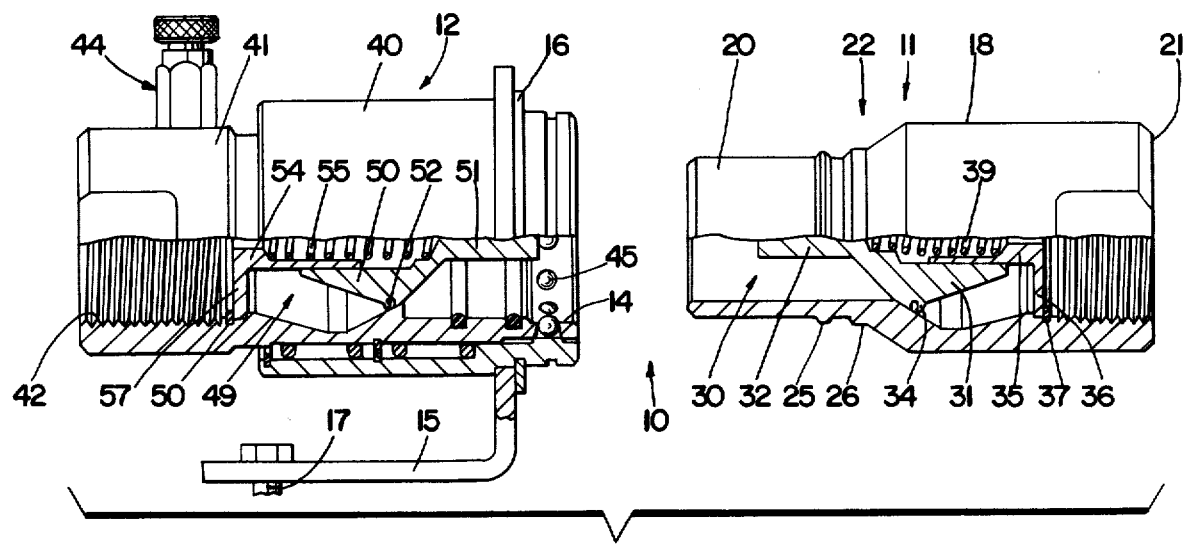
FIG. 1 is an elevational view partly in cross section of the female and male coupler elements shown in aligned but slightly separated relation.

Referring now to the drawings there is shown in FIG. 1 a disconnected view of the fluid coupling 10 comprising a male coupler 11 and a female coupler 12, the latter having a socket 14 at the right hand end thereof for receipt of the male coupler 11. An angle clamp 15 supports the female coupler, being secured thereto by means of a retaining ring 16. The clamp 15 may be secured by bolt 17, to an implement to which anhydrous ammonia is to be delivered.

Male coupler element 16 comprises a generally tubular body element 18 having a reduced nose portion 20 and an internally threaded rear portion 21 adapted for coupling to hose or the like for the receipt of fluids, such as anhydrous ammonia, from a nurse tank or other reservoir. Typically, a shut-off valve (not shown) is included in the hose connection between such reservoir and the male coupler 11 so that fluid pressure in such conduit can be reduced to facilitate coupling and uncoupling of the fluid connector. Located rearwardly of the nose portion 20 of the male coupler 11 is a detent receiving recess 22 forming a part of a detent locking connection between the male and female coupler elements. As may be seen as well in englarged views in FIGS. 2-4 the detent receiving recess 22 consists of an annular groove 24 located adjacent a forward ridge 25 and a rearward ridge 26. The walls forming the ridges 25, 26 are sloped, thereby providing also sloped walls for the annular groove 24 to assist in the movement of locking balls received in the detent receiving recess 22, and is well understood in the art.

A valve assembly 30 is provided within the male coupler 11 consisting of a generally tubular body member 31 and a solid cylindrical nose portion 32, the latter normally positioned centrally within the nose portion 20 of the male coupler 11. The valve body member 31 supports at its periphery an annular resilient sealing element 34 which is positioned to engage an inclined interior wall surface of the body member 18 to close the fluid passageway therethrough. The valve body member 31 is supported for axial movement relative to the body of the male coupler 11 on a tubular perch 35, the latter supported by flange 36 or spider portion and retaining ring 37 in an internal peripheral groove of the body member 18. Flange 36 is not circumferentially continuous but comprises several circumferentially spaced radially extending legs with openings therebetween to provide a flow path through body 18 when valve body member 31 is inserted. A valve spring 39 is compressively supported within the valve body member 31 and the tubular perch 35 and biases the body member to the left and thus the sealing element 34 into sealing engagement with the internal wall of the male coupler body element 18 while allowing rearward movement of same relative to the body to a valve open position.

A female coupler 12 of the fluid coupling 10 comprises generally a sleeve 40 and a tubular body element 41 supported within the sleeve for relative axial movement. As indicated the sleeve 40, by means of external peripheral grooves, is supported by angle clamp 15 and fixed in relation to an implement such as a cultivator to which the fluid or other material is to be delivered.

Opposite the socket 14 of the female body element 41 is an internally threaded end 42 adapted for connection to a hose or the like to deliver fluid to a metering device or other form of distributor or other utilization device. A bleed valve 44 is provided at the threaded end 42 and communicates with the interior of the body element 41 for release of fluid pressure therein to facilitate the coupling and uncoupling movements of the fluid connector.

Socket portion 14 of the female coupler 12 further comprises a plurality of circumferentially distributed balls 45 supported in conical sockets in the body element 41 for axial movement with such body element and for radial movement relative thereto into and out of engagement with the detent receiving recess 22 for securing or releasing the male coupler 11, comprising a detent mechanism well understood in the art.

At the socket portion 14 and further inward of the ball detents 45, situated in internal annular recesses of the body element 41 are a pair of O-ring seals 48 to provide fluid tight engagement with the nose portion 20 of the male coupler 11 when the latter is interfitted into the female element 12. A valve assembly 40, similar to that in the male coupler 11 is provided in the interior of the female body element 41 to close or open the fluid passageway therethrough. Such assembly 49 comprises a generally tubular valve body member 50 having a cylindrical nose portion 51 and peripheral annular seal 52 adapted to engage and seal the interior wall of female body member 41. Valve body member 50 is slidably supported by tubular perch 54 having circumferentially spaced radially extending flange portions 57 secured by retaining ring 56, for axial movement relative to the body member 41. Spaces between flange portions 57 provide for flow through body element 41 when valve element 50 is inserted. A valve spring 55 located between the perch 54 and the valve body member 50 urges the latter to the right as viewed in FIG. 1 and thus the seal 52 into engagement with the wall of the body member 41 to close the passage therethrough.

Figure 2:
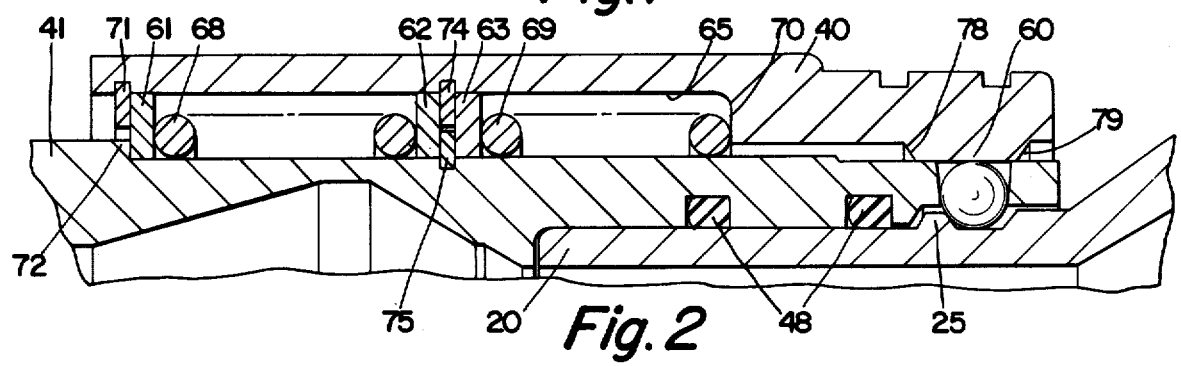
FIG. 2 is an enlarged sectional view of a portion of the coupler showing the male and female couplers in completely interfitted relation.
Figure 3:
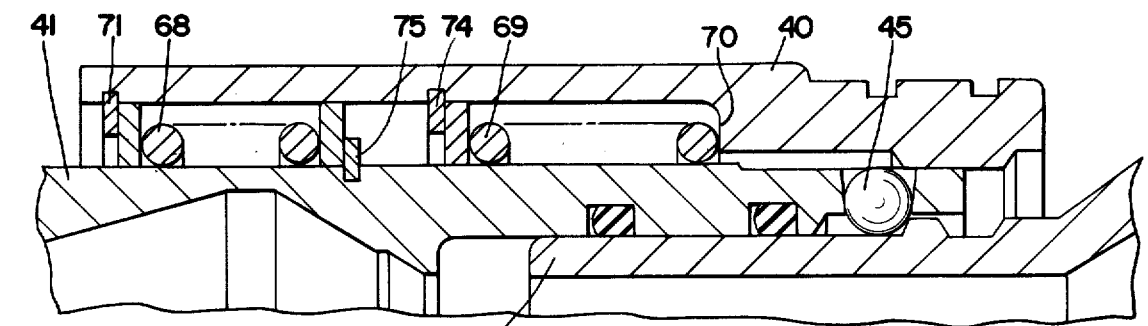
FIG. 3 is a view similar to FIG. 2 but showing the relationship of the male and female coupler elements during the coupling sequence when only one spring is compressed.
Figure 4:
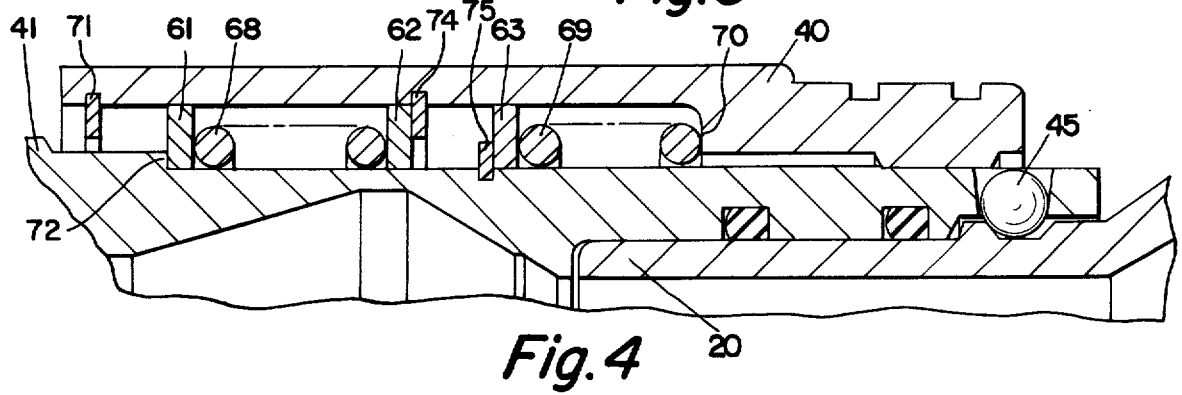
FIG. 4 is a view similar to FIG. 2 but showing the relationship of the male and female coupler elements during the uncoupling sequence when both springs are compressed.

As seen most clearly in the enlarged views of FIGS. 2-4 female body element 41 is supported within sleeve 40 by means of radially inwardly protruding detent ridge 60 at one end of the sleeve 40 and first, second and third annular washers 61, 62, 63 at the other end of the sleeve disposed in an annular space 65 between the sleeve 40 and the body element 41.

First and second springs 68, 69 surround the body element 41 being coaxially located adjacent one another in the annular space 65, the first spring 68 being disposed between the first and second washers 61, 62 and the second spring 69 being disposed between the third washer 63 and the radially extending wall 70 of the sleeve 40, forming one end of the annular space 65. A first annular retaining ring 71 forms an end wall for the annular space 65 and is disposed in an internal groove in the sleeve 40 at one end thereof opposite a stop ridge 72 on the body element 41 when the sleeve and body element are in the relative rest position depicted in FIG. 2. The first washer 61 thus bears against both the retaining ring 71 and the stop ridge 72 under influence of the first spring 68. Located between the second and third washers 62, 63 and in annular grooves opposite one another in the sleeve 40 and the body element 41 when the elements are in the rest position depicted in FIG. 2, are outer 74 and inner 75 retaining rings fixed respectively for movement with the sleeve 40 and female body element 41, the rings 74, 75 thereby forming a separable wall section.

In the preferred embodiment of the invention first and second coupler springs 68, 69 are alike in characteristics and the retaining rings 74, 75 are located midway of the axial extent of the annular space 65 between the first retaining ring 71 and the radial wall 70. With such selected parameters and referring more particularly to FIG. 3 depicting the coupling mode of operation, it is seen that the nose 20 of the male coupler while interfitting sufficiently with the tubular body element 41 to engage the O-ring seals 48 is prevented from further entry by interference of the detent balls 45, maintained radially inwardly by the detent ridge 60 of the sleeve 40. Continued movement of the male coupler 11 toward the left as viewed in FIG. 3 will cause axial movement also of body element 41 against the bias of the first spring 68 due to the intermediacy of first retaining ring 71, first washer 61, second washer 62 and inner retaining ring 75. Such coupling movement will continue against the bias of spring 68 until detent balls 45 pass the sloped inner wall 78 of detent ridge 60 to allow radial outward movement of the balls 45. Upon such movement, clearance is provided for forward ridge 25 of the male coupler 11 to pass under the balls 45, allowing the latter to be deposited in the annular groove 24 whereupon clearance is again provided between the detent balls 45 and the detent ridge 60 so that the female body element 41 together with the now coupled male element 11 may move back to the rest position depicted in FIG. 2 under urging of the first spring 68. During this operation it is noted that second spring 69 has been retained between the outer retaining ring 74 and the radial wall 70, both fixed relative to the sleeve 40, and has contributed no action. Thus the coupling force encountered in the joining of the male and female couplers is solely a function of the spring rate of the first spring 68.

During the coupling mode of operation it will be apparant that the nose portions 32, 51 of the male and female body elements 31, 41 respectively have engaged one another and thus have moved the body elements and thus the respective seals 34, 52 away from the interior walls to open the fluid passageway through the coupling 10. Upon disengagement of the coupling, valve closing in both the male and female couplers will automatically occur under the influence of the valve springs 39, 55. Valve springs 39, 55 are sufficiently light so as to contribute no substantial effect upon the coupling and uncoupling forces provided by the coupler springs 68, 69.

In the uncoupling mode of operation, however, as depicted in FIG. 4 it is seen that both the first and second springs 68, 69 cooperate to resist outward or uncoupling movement of the male and female body members. Thus initial movement to the right of male coupler 11 in an uncoupling action results in engagement of the forward ridge 25 with the detent balls 45 forcing the body element 41 to move with the male coupler 11 until a position is reached, as depicted in FIG. 4, wherein the balls 45 pass the outer wall 79 of the detent ridge 60, providing release of the male coupler 11. During this operation springs 68, 69 while situated in tandem are operative in unison to resist the rightward movement of the body element 41, the first spring 68 being compressively actuated through the intermediacy of the outer retaining ring 74 fixed to the sleeve 40 and the second washer 62, with the first washer 61 being carried to the right by the stop ridge 72 on the body element 41. Simultaneously second spring 69 is placed in compression through the intermediacy of the radial extending wall 70, the third washer 63 and the inner retaining ring 75, the latter fixed for movement with the body element 41.

Again upon radial outward movement of the detent balls 45 and release of the male coupler 11, clearance is again provided between the balls 45 and the detent ridge 60 and the body member 41 will be returned to the rest position of FIG. 2 under the urging now of both springs 68 and 69.

While in the preferred embodiment of the invention identical springs 68, 69 are desired it is apparent that some modification can be made to the spring rates, size of springs or location of retaining rings 71, 74, 75 to achieve variations in operation. Thus, for example, since only the first spring 68 is operative during the coupling mode of operation it may have a relatively low rate so as to provide a low level of coupling force, while spring 69 may have a high rate so as to provide the major influence to prevent disconnection of the coupling, with a relatively minor contribution from the first spring 68. Since, however, relative movement between the body member 41 and sleeve 40 does occur while the body members are coupled due to vibrations and other external influences, the spring rates of both such springs 68, 69 are desirably relatively high to tend to maintain the body members in the "rest" position of FIG. 2 and to prevent undue wear upon the relatively moving elements of the coupling.

I claim:

1. A fluid coupling comprising a female member and a male member insertable into the female member to effect interconnection therewith, said male member having a detent receiving recess for effecting a locking connection between said members, said female member comprising an outer sleeve member having means thereon for fixing it against axial movement, an inner section adapted for sealing engagement with said male member and axially movable therewith relative to said sleeve member, detent means supported by said inner section for axial movement therewith and engageable with said sleeve member for radial movement into and out of the detent receiving recess of said male member, spring means acting between said inner section and said sleeve member for resisting relative movement therebetween to provide one level of uncoupling force when said inner section is moved in one direction and a second lower level of coupling force when said inner section is moved in the opposite direction, said spring means comprising first and second compression springs axially disposed in an annular space between said inner section and said sleeve member and further including abutment means carried by said inner section and said sleeve member for compressively engaging both said first and second springs when said inner section is moved in one direction and for compressively engaging only said first spring when moved in the opposite direction said abutment means comprising first, second and third axially spaced abutments fixed on said sleeve member and first and second axially spaced abutments fixed on said inner section, each of said abutments being disposed at an end of said first and second springs, said second abutments being disposed between said first and second springs, said first spring being biased between said first inner section abutment and said second sleeve member abutment in said one direction and said second spring being biased between said second inner section abutment and said third sleeve member abutment in said one direction, said first spring being biased between said second inner section abutment and said first sleeve member abutment in said opposite direction.

2. A fluid coupling as set forth in claim 1 wherein both said male member and said female member include spring biased fluid retaining valves therein which are opened when the members interfit, and which are closed when said members are disconnected.

3. A push-pull coupling for fluids, comprising male and female body members connectable in fluid tight relation, each of said body members having a check valve therein for preventing flow of fluid when said body members are disconnected, said check valves being engageable with one another when said body members are connected to provide a path for fluid flow therethrough, said male and female body members having interengageable detent means thereon for securing said body members in a connected relation, said female body member comprising a fixed sleeve supporting a tubular body member therein adapted for sealing engagement with said male body member and forming an annular space between said sleeve and said tubular member, said tubular member being supported for axial movement relative to said sleeve under urging of said male body member to engage and disengage said detent means, and spring means positioning said tubular member relative to said sleeve in a first detent engaged position, said spring means comprising first and second axially adjacent compression springs in said annular space surrounding said tubular member and abutment means on said sleeve and said tubular member for operatively engaging both said first and second springs to resist movement of said tubular member in one direction relative to said sleeve and thus to resist disengagement of said detent means and resultant disconnection of said body members, and for operatively engaging only said first spring to resist movement of said tubular member in the opposite direction relative to said sleeve to provide a lower force for engagement of said detent means and thus for coupling of said body members, said abutment means comprising first, second and third abutments on said sleeve engageable with said springs and fourth and fifth abutments on said tubular member, said first spring being biased between said first tubular member abutment and said second sleeve abutment in said one direction and said second spring being biased between said second tubular member abutment and said third sleeve abutment in said one direction, said first spring being biased between said second tubular member abutment and said first sleeve abutment in said opposite direction.

4. A female coupling membr having means for connection to a male coupling member that has a detent receiving recess, said female member having an inner sleeve with a bore to receive said male coupling member and carrying radially movable detent means, an outer sleeve slidably mounted on the inner sleeve for reltive movement therebetween, and having a portion for holding the detent means in a radially inner position when the outer sleeve is in a first position relative to the inner sleeve, said portion being out of register with said detent means when the outer sleeve is relatively moved in either direction from said first position, first and second springs biasing said outer sleeve toward said first position, said outer sleeve being relatively movable in one direction from said first position on the inner sleeve and having means thereon for compressing said first spring in such relative movement, and said outer sleeve being relatively movable in an opposite direction from said first position and having means thereon for compressing both of said springs in said relative movement, said inner sleeve having first and second spaced radially outward fixed abutments, said outer sleeve having a first radially inwardly extending abutment opposite said first outward abutment, a second radially inwardly extending abutment opposite said second outward abutment and a third radially inwardly extending abutment spaced from said second outward abutment, said first spring being biased between said first inner sleeve abutment and said second outer sleeve abutment in said one direction and said second spring being biased between said second inner sleeve abutment and said third outer sleeve abutment in said one direction, said first spring being biased between said second inner sleeve abutment and said first outer sleeve abutemnt in said opposite direction.

* * * * *